(12) United States Patent
Porter et al.

(10) Patent No.: US 6,181,781 B1
(45) Date of Patent: *Jan. 30, 2001

(54) VOICE MAIL SYSTEM THAT DOWNLOADS AN APPLET FOR MANAGING VOICE MAIL MESSAGES

(75) Inventors: Lawrence Leon Porter, Lyndhurst (GB); Mark George Stewart Reid Thomas, Boulder, CO (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/882,709

(22) Filed: Jun. 25, 1997

(30) Foreign Application Priority Data

Nov. 12, 1996 (GB) .................................... 9623478

(51) Int. Cl.[7] .................................... H04M 3/537
(52) U.S. Cl. .................................... 379/88.17; 379/88.12; 709/228
(58) Field of Search .................................... 379/88.12, 88.17, 379/93.24; 709/202, 206, 207, 203, 228; 395/200.32, 200.36, 200.37; 705/14; 707/104, 8

(56) References Cited

U.S. PATENT DOCUMENTS

| 4,612,416 | 9/1986 | Emerson et al. | 179/6.11 |
|---|---|---|---|
| 5,333,266 | 7/1994 | Boaz et al. | 395/200 |
| 5,434,907 | 7/1995 | Hurst et al. | 379/88 |
| 5,572,643 | * 11/1996 | Judson | 395/793 |
| 5,608,786 | 3/1997 | Gordon | 370/352 |
| 5,647,002 | * 7/1997 | Brunson | 709/206 |
| 5,675,507 | 10/1997 | Bobo, II | 709/206 |

(List continued on next page.)

FOREIGN PATENT DOCUMENTS

| 0586954 | 3/1994 | (EP) . |
|---|---|---|
| 0660574 | 6/1995 | (EP) . |
| 2213349 | 8/1989 | (GB) . |
| 2294608 | 5/1996 | (GB) . |
| 2301260 | 11/1996 | (GB) . |
| WO87/07801 | 12/1987 | (WO) . |
| WO96/20553 | 7/1996 | (WO) . |

OTHER PUBLICATIONS

Corcoran, C., Hot Stuff: Enterprise Computing, mar. 1996, InfoWorld, vol. 18, Iss. p. 1.*
Friedel et al., Café Programming FrontRunner, Jun. 1996, The Coriolis Group, ISBN: 1576100030, Ch. 9.*
http://pioneer.pointcast.com/index.html. Undated.
Computer Reseller News, Nov. 28, 1994, p12 "AT&T: Internet can talk, too".

* cited by examiner

Primary Examiner—Scott L. Weaver
Assistant Examiner—Roland G. Foster
(74) Attorney, Agent, or Firm—Jerry W. Herndon (57) ABSTRACT

Using the Internet World Wide Web (WWW) network 320, a WWW Client 310 can communicate with a WWW Server 330 to request access to and notification of a user's voice mail. The user enters their voice mail mailbox number, and activates an appropriate hyperlink. The WWW Server then launches an application, MSG Client 350, which in turn communicates with an application, MSG Server 370, that runs in conjunction with the voice mail system 380, 385, 390. In response to an initial message from the MSG Client, the MSG Server returns information about all voice mail messages within the specified mailbox, which are displayed at the WWW Client. This display includes a hyperlink to each message in the mailbox. In addition, the MSG Server downloads an applet for execution on the WWW Client. This applet communicates with the voice mail system in order to provide up-to-date notification of incoming messages.

33 Claims, 3 Drawing Sheets

U.S. PATENT DOCUMENTS

| | | | |
|---|---|---|---|
| 5,715,453 | * | 2/1998 | Stewart . |
| 5,717,742 | * | 2/1998 | Hyde-Thomson ................ 379/93.24 |
| 5,729,594 | * | 3/1998 | Klingman ......................... 379/93.12 |
| 5,732,126 | * | 3/1998 | Fitzpatrick et al. .............. 379/93.24 |
| 5,737,395 | * | 4/1998 | Irribaren .......................... 395/200.02 |
| 5,737,619 | * | 4/1998 | Hudson ............................... 395/761 |
| 5,740,549 | * | 4/1998 | Reilly et al. .......................... 705/14 |
| 5,751,968 | * | 5/1998 | Cohen ................................. 709/231 |
| 5,799,318 | * | 8/1998 | Cardinal et al. ..................... 707/104 |
| 5,805,587 | * | 9/1998 | Norris et al. ......................... 379/215 |
| 5,848,396 | * | 12/1998 | Gerace ................................. 705/10 |
| 5,887,139 | * | 3/1999 | Madsion, Jr. et al. . |
| 5,905,492 | * | 5/1999 | Straub et al. ....................... 345/333 |
| 5,963,618 | * | 10/1999 | Porter ............................... 379/88.17 |
| 6,052,367 | * | 4/2000 | Bowater et al. ..................... 370/352 |

VOICE MAIL SYSTEM THAT DOWNLOADS AN APPLET FOR MANAGING VOICE MAIL MESSAGES

BACKGROUND OF THE INVENTION

The present invention relates to voice mail systems, and in particular to the way in which subscribers to such voice mail systems can be notified that they have new messages.

Voice mail systems (also termed voice messaging systems) attach to the telephone network, often via a PBX, and are used to store messages from incoming calls when the intended recipient is absent or otherwise engaged. The intended recipient (a subscriber) can then listen to their stored messages at some future time. A voice mail system is generally implemented either on special purpose computer hardware, or else on a standard computer workstation equipped with a suitable telephony interface. Such voice mail systems are well-known; one example is the Direct-TalkMail system, available from IBM Corporation, which operates in conjunction with the DirectTalk/6000 voice processing system (also available from IBM). Other examples of voice mail systems are described in U.S. Pat. No. 5,136,648 and EPA 0588576.

An important feature of such voice mail systems is their ability to notify subscribers that they have a message waiting. This notification is often performed either by a light on the subscribers telephone handset, or via some audible prompt next time the subscriber tries to dial out.

In recent years various attempts have been made to provide a more unified mail system which can handle both voice messages and computer email messages (such systems are sometimes referred to as multimedia systems). For example, WO87/07801 discloses an integrated system which combines a voice mail system and a computer e-mail system. In this integrated system, the user may designate one mail system (ie voice or computer) as the primary recipient for all messages. For example, if the computer is chosen as the primary recipient, then notifications of both telephone and e-mail incoming messages are provided at a desktop computer. Alternatively it is possible to chose to receive notifications of all messages via the voice mail system. In this latter case, a text to speech system may also be used to allow text (ie e-mail) messages to be accessed over the telephone. Another integrated messaging system is taught in U.S. Pat. No. 5,333,266. Commercially available products which provide integrated or unified messaging include CallXpress3 DeskTop for Windows, available from Applied Voice Technology Incorporated, VMX DeskTop for Windows, available from VMX Incorporated (now part of Octel Communications Corporation), and Intuity from AT&T, described in Computer Reseller News, Nov. 28, 1994, p12.

The typical desktop computer interface of such unified systems provides for much greater and more flexible information interchange between the subscriber and the voice mail system than has hitherto been practicable. Thus the user no longer has to try to remember information and instructions played out from the voice mail system, rather this can be conveniently displayed on the computer screen. Likewise, user input commands to the voice mail system are no longer restricted to the conventional 12 touchtone (DTMF) keys on a telephone keypad, but rather can exploit the whole computer keyboard and full power of the GUI. An additional benefit of a unified mail system of course is that a user may process both voice mail and e-mail in the same session.

Nevertheless, there are problems with developing such computer interfaces for voice mail systems. Thus the big advantage of conventional voice mail systems is that a user can access them from a standard telephone anywhere in the world, because the telephone is both uniform and ubiquitous. By contrast, the computer world is full of heterogeneity; users are often equipped with a variety of computers and operating systems even within a single organisation. In addition, remote access to the voice mail system may be much more difficult via a computer network than through the telephone network.

The above problems can be overcome by providing access to a voice mail system from a WorldWideWeb (WWW) client on the Internet, as described in PCT patent application PCT/GB95/02009. This allows subscribers to access their voice mail from any WWW client that has an Internet connection. In particular, by going to a WWW page representing the voice mail system, and by entering their mailbox number, a subscriber can see how many new and old messages he or she has, and optionally can select a message to listen to.

The above-mentioned PCT application therefore provides a voice mail system which allows subscribers to review and access their messages over the WWW. However, the system described therein does not address message notification over the WWW, other than requiring a user to repeatedly re-load the same page whenever they wish to see if any new messages have arrived (note that because some browsers may cache WWW pages, such repeated re-loading may in fact require the browser to be terminated and re-started).

SUMMARY OF THE INVENTION

Accordingly, the invention provides a voice mail system, including:

means for storing voice mail messages for at least one subscriber;

and server means, responsive to a request from a subscriber at a WWW client terminal, for returning to said WWW client terminal an applet for execution at said WWW client terminal, said applet on execution providing a continuously updated indication of whether said subscriber has any new messages stored in the voice mail system.

In one preferred embodiment, the voice mail system further includes means for receiving from said applet a request that new messages for the subscriber should be notified to the applet. Each subscriber has a profile at the voice mail system indicating how that subscriber should be notified of the arrival of a new message. This profile is updated on receipt of said applet request in order that the applet be notified accordingly of the arrival of a new message. Preferably the means for receiving further includes means for receiving a request from the applet that new messages should no longer be notified to the applet, and means for updating said profile accordingly.

In another preferred embodiment, the voice mail system further includes means for receiving from said applet an inquiry as to whether any new messages have been received for that subscriber, means for determining whether any new messages have been received for that subscriber, and means for returning an appropriate response to the applet. Typically the subscriber sends these inquiries at regular intervals (automatically), perhaps a few minutes appart, to ensure that the subscriber is always provided with an up-to-date indication of the existence of waiting voice messages.

Preferably the applet comprises Java code, which is downloaded from the voice mail system over the Internet for execution by the WWW Client. The use of the Internet for voice mail notification is particularly advantageous, since general purpose World Wide Web (WWW) clients (ie browsers) are already available for all commercially significant platforms, and very familiar to users. The Internet also provides all the networking required to support the WWW, effectively transparently to the user (ie a user does not need to have any knowledge of the actual network structure within the Internet). In addition, the Internet infrastructure provides a very cost-effective way of communicating between sites. It will be appreciated that most of these advantages apply not only to the Internet, but also to intranets (networks similar to the Internet, but generally contained within a single organisation).

Messages from the client system to the voice mail system generally include the mailbox number for the subscriber, corresponding to where the messages are stored (or possibly some other suitable identifier, such as possibly the name of the subscriber). It is also preferred that such messages further utilise a subscriber password, thereby preventing unauthorised access to the voice messages.

It is preferred that when the voice mail system returns information to the client concerning the presence of new messages for the subscriber, this information actually includes the number of new messages. It may also be desirable to return additional information about the messages, such as the time when the message was received, and the identity of the caller (if available).

The invention further provides a method of notifying a subscriber to a voice mail system that there is at least one new voice mail message waiting for the subscriber, wherein said subscriber has a program executing at a client terminal where said subscriber is located, the method comprising the steps of:

exchanging messages between said program and said voice mail system to retrieve information indicating whether there are any new voice mail messages waiting for the subscriber; and, providing by said program to the subscriber a continuously updated indication of the presence of any new voice mail message.

In a first preferred embodiment, said step of exchanging messages includes: transmitting from said program to said voice mail system a request that new messages for the subscriber should be notified to the program. Each subscriber at the voice mail system has a profile indicating how that subscriber should be notified of the arrival of a new message, and responsive to the receipt of said request, this profile is updated to indicate that the program be notified of the arrival of a new message for the subscriber. Subsequently, notifications are then transmitted to the subscriber in accordance with said updated profile, typically using a server which the subscriber can repeatedly access.

In a second preferred embodiment, said step of exchanging messages comprises: repetitively transmitting from the program an inquiry as to whether any new messages have been received for that subscriber, determining whether any new messages have been received for that subscriber, and returning an appropriate response to the program.

Thus it can be seen that in the first embodiment, the additional notification mechanism is provided essentially as an enhancement to the already available notification facility in the voice mail system, subject to the specific request of the client. By contrast, the second embodiment does not require any specific notification facility in the voice mail system. For example, the notification facility could be provided by the voice mail system described in the above-mentioned PCT application, without any actual change to the voice mail system itself, by the program using the http protocol to repeatedly request the WWW page listing the messages for that subscriber. By comparing the received page with a previously retrieved version, it would be possible for the client to determine whether or not any new messages had arrived.

The invention also provides a client system for allowing a subscriber to a voice mail system to determine whether he or she has at least one new voice mail message, said client system being connected to said voice mail system via a network, and comprising:

means for exchanging messages with said voice mail system to retrieve information indicating whether there are any new voice mail messages waiting for the subscriber; and, means for providing to the subscriber an indication of the presence of any new voice mail message.

BRIEF DESCRIPTION OF THE DRAWINGS

Preferred embodiments of the invention will now be described in detail, with reference to the following drawings.

DETAILED DESCRIPTION OF THE PREFERRED EMBODIMENT

Figure 1:
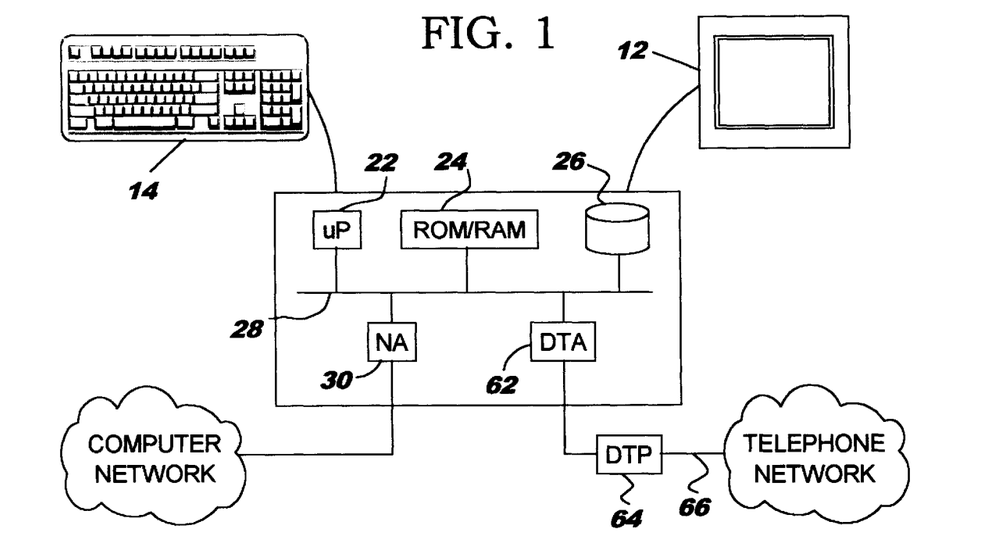
FIG. 1 is a simplified diagram of a voice mail system.

FIG. 1 is a simplified diagram of a voice mail system based on a conventional computer workstation comprising system unit 20, display screen 12, and keyboard 14. The system unit includes a microprocessor 22, ROM/RAM 24, and disk storage 26, connected together via bus 28. In order to operate as a voice mail unit, the computer workstation is connected to telephone line 66 via a digital trunk processor 64 and a digital trunk adapter card 62. The voice mail system also includes a network adapter card 30 to connect the voice mail system to a computer network (eg a LAN). The voice mail system may also include other known components, such as an audio capture/playback card, a CD-ROM and mouse (not shown).

The voice mail system illustrated in FIG. 1 is based on the DirectTalk/6000 voice processing system, available from IBM Corporation. The hardware components of this system are an RISC System/6000 computer workstation, plus the digital trunk processor and digital trunk adapter. The DirectTalk/6000 system connects to the telephone network through a T1 or E1 digital trunk line 66 (and via a PBX in most installations). The digital trunk processor is used to demultiplex incoming signals and multiplex outgoing signals on the trunk line, and perform log-linear conversion as appropriate. The digital trunk processor is also used to perform compression/decompression. The digital trunk adapter effectively acts as an interface between the workstation itself and the digital trunk processor. Further details about the DirectTalk/6000 voice processing system can be found in the manual "IBM Callpath DirectTalk/6000, General Information and Planning" (publication number GC33-1720-00) and the other manuals referenced therein.

Figure 2:
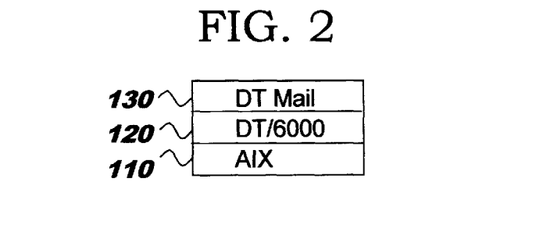
FIG. 2 is a simplified diagram of the main software components of the voice mail system of FIG. 1.

FIG. 2 is a simple block diagram of the main software components running on the voice mail system of FIG. 1. Running on the RISC System/6000 is first of all the operating system for the workstation, which in the present case is AIX 110, and then the DirectTalk/6000 software 120 itself. Also on the RISC System/6000 workstation, effectively running as an application on top of DirectTalk/6000, is DirectTalkMail 130, which provides standard voice messaging capabilities. Thus the DirectTalkMail voice messaging system contains routines to allow callers to telephone messages into the database and users to extract messages from the database for listening over the telephone, as well as other functions such as forwarding messages.

It will be appreciated that voice mail systems such as that illustrated in FIGS. 1 and 2 are well-known, and that many variations on the system illustrated are also well-known. For example, there are many systems in which telephone line 66 is analog, in which case the digital trunk processor is often omitted, and its functions performed, where appropriate by a suitable telephony adapter card. The precise hardware configuration employed in the voice mail system is not relevant to an understanding of the present invention, and so will not be discussed further. Similarly, the standard operation of a voice mail system is well-known in the art, and so only those aspects pertinent to an understanding of the present invention will now be described.

The DirectTalkMail voice messaging system can be considered as a form of database system, based on mailboxes. Thus each user has a mailbox, which has associated with it in a user profile all the information for that user, eg their extension number, their password, the number of new messages that they have, their current greeting, and so on. The mailbox also logically contains the digitised stored messages for that user (although physically the audio recording may be stored in a different location from the other information). Each mailbox has a unique identifier, such as a number or name, for example, each mailbox can be allocated the extension number of the user associated with that mailbox.

The DirectTalkMail voice mail system also includes a notify facility, which is activated whenever a new message is received, or whenever a user listens to some or all of their new mail. The DirectTalkMail system supports various mechanisms for notifying a user of the arrival of a new message; for example, DirectTalkMail can send an instruction to an attached PBX to illuminate a "message waiting light" on the telephone handset of the relevant user. It is also possible to send an email message to the user, or to activate a user's pager (on a time-dependent basis if desired). A user can select as many of these notification methods as desired (they are not alternatives), and the selections are stored in the user profile, along with any other pertinent information (such as an email address to which a notification should be sent). Then, when the notify facility is triggered by the arrival of a new message for that user, the desired notification methods for the user are performed.

Figure 3:
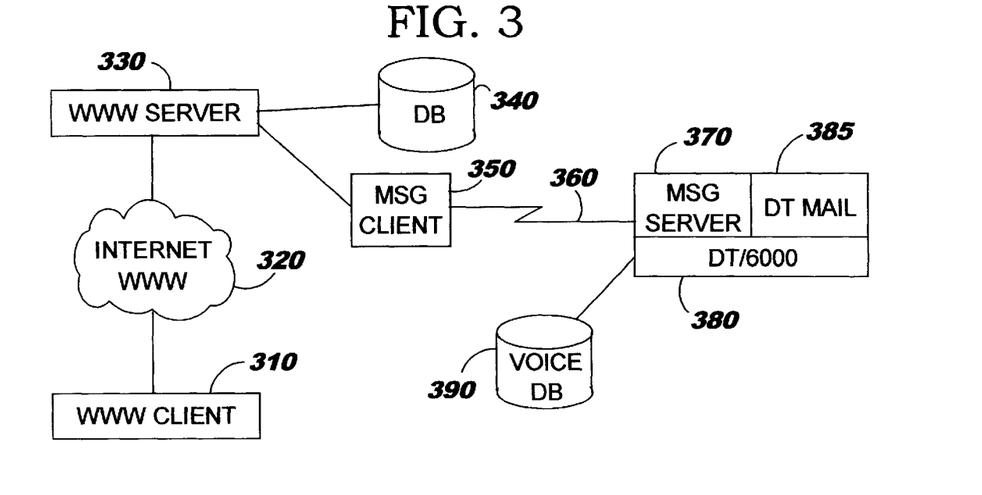
FIG. 3 is a schematic diagram of a system to provide access to voice mail over the Internet World Wide Web (WWW) in accordance with the invention.

FIG. 3 illustrates schematically the architecture of a first embodiment of the present invention, whereby access can be provided to voice mail messages in a voice mail system over the Internet World Wide Web (WWW). More specifically, a user at a WWW client 310, can obtain access to their voice mail through the Internet WWW communication network 320 and a WWW server 330. The server in turn is attached to a message client 350, which communicates with a message server 370. This latter component is an application on a DirectTalk/6000 voice processing system which is used to access voice message information, including the voice messages themselves, and direct this back towards the requesting WWW Client.

Reviewing now the structure of the WWW, this is based on Universal Resource Locators (URLs), which can be regarded as specifying a particular page or file on the WWW. The URL denotes both the server machine, and the particular file or page on that machine. There may be many pages or URLs resident on a single server. If a user at a WWW client 310 selects a URL on WWW server 330, then the server performs an action specific to that page. In some cases this can lead to the server launching an application, but in the majority of cases the server retrieves the requested page from a database 340 of stored pages, and this is transmitted back over the WWW 320 to the WWW client for display to the user. The pages are formatted in accordance with a standard format known as HTML. Many pages include images which are stored in separate graphics files at the server, for example in standard ".gif" or ".jpeg" format. The HTML text contains references to these graphics files, which prompt the client to also retrieve the specified files from the server, thereby allowing the client to display both the HTML text and associated images. Other pages available on the WWW include video or audio excerpts, for example from studios advertising their latest films or compact disk recordings.

The WWW client 310 provides the user with a simple GUI, allowing the user to navigate over the WWW network 320 to different URLs. Sometimes a user will specify a particular URL by name, but more often a user will jump from one URL to another by means of references within a page (a so-called "hyperlink"). Thus a particular word or symbol on a page can be associated with another URL, so that selection of that word or symbol, eg by clicking a mouse at the relevant location, causes the client to retrieve and display the page from the selected URL. This new page may be located on a completely different server from the first page. Words or symbols which map to another URL are sometimes referred to as "hot button" (or similar). There may be many hot buttons or hyperlinks in a single page.

There are a variety of web clients 310 commercially available, for example Navigator from NetScape Communications Corporation. All such clients understand HTML and other WWW standard formats and can display or output correctly files in these formats. Similarly, the mechanisms for navigating between different URLs are also understood and implemented by such programs. Further information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994).

As so far described, pages on the WWW are essentially static, in other words, they simply present data, images, audio or video. However, recently there has been considerable interest in including code within a WWW page, which then can be downloaded and executed at the client. The most popular method of achieving this is to utilise the Java technology, developed and available from Sun Microsystems Inc. Part of the Java technology includes a new programming language, known as Java. Programs written in this language can be incorporated into a WWW page by using the HTML <APPLET> tag, which prompts a Javaaware browser to download and execute the referenced applet (an applet is code downloaded for execution over the network). The Java technology is described in more detail in "Teach Yourself Java in 21 days" by L Lemay and C Perkins, 1996, Sams.net Publishing, Indianapolis, U.S.A.

Figure 4:
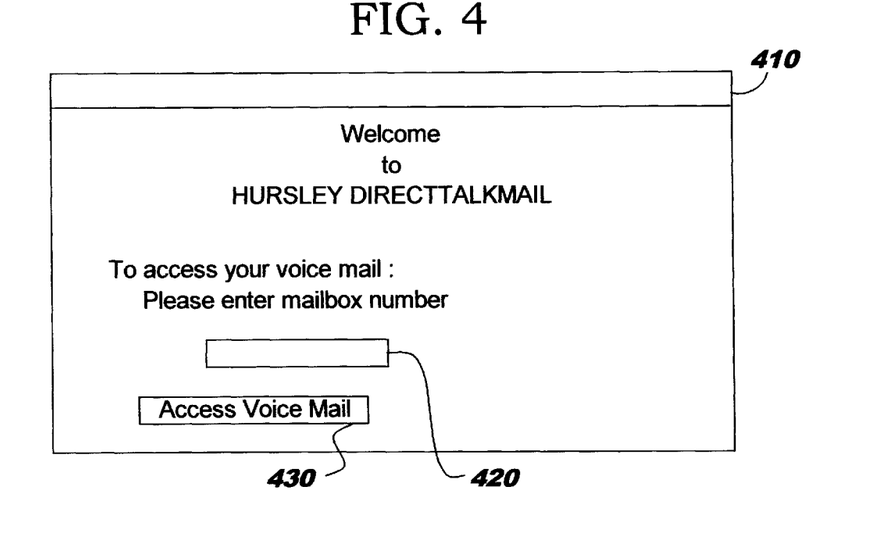
FIG. 4 is an illustration of a WWW screen providing access to a voice mail system.

The use of the WWW to provide access to voice mail is described in the above-mentioned PCT application. As taught therein, a user needs to know firstly the URL corresponding to the voice mail system, and secondly their own mailbox number. Note that these will be the same irrespective of the location of a user (unlike a telephone number, where local/district codes may be dropped, and international access codes may vary). When the user enters the URL of the voice mail system, this results in a request being passed to the server 330. The server then retrieves a corresponding HTML file from the database 340, which produces a screen display as shown in FIG. 4. At the top of this screen is a control bar 410, which is provided in known fashion by the WWW Client to allow the user to control their interaction with the WWW. For example, buttons on the control bar may be used to return to a previously accessed URL, to abort access to the currently requested URL, to display the location of the current URL, and so on. In terms of the information actually supplied by the WWW Server, apart from a general welcome, there are three main features of interest. The first is a box 420 into which a user is prompted to enter their mailbox number. Data entry in this manner is well-known in WWW operations. Secondly, there is a box 425 into which the user is prompted to enter their password. Finally, there is a hot button or hyperlink 430, which the user selects to obtain remote access to their voice mail.

In standard fashion, if the hyperlink 430 is activated, the WWW client 310 transmits a message to this effect back to WWW server 330. This message also includes the mailbox number entered by the user. In the present embodiment the WWW server 330 is the host for both the page shown in FIG. 4, and for the hyperlink 430, although this does not have to be the case. The WWW server, as resident target for the hyperlink 430, maintains information which indicates that it corresponds to an application, rather than to a simple page of information from database 340 (such as was displayed in FIG. 4). Thus in response to activation of the hyperlink, the WWW server identifies and launches the application corresponding to the hyperlink URL. This application is shown in FIG. 3 as MSG Client 350. Note that in the present embodiment, MSG Client is situated on the same machine as the WWW Server.

The MSG Client 350, when activated, initiates communications with another application, MSG Server 370, which as shown in FIG. 3 effectively runs on top of the DirectTalk/6000 voice processing system 380, in parallel with the voice messaging software 385. In order to start such communications, MSG Client knows the network address and predetermined port number for MSG Server 370, allowing a standard UNIX socket to be set up between the two. This allows the MSG Client and MSG Server to communicate in known fashion. The WWW server passes to the MSG Client application certain start-up parameters, in particular the selected mailbox number, password, and also a control parameter referred to as a message type, which is set to zero. The basic mode of operation for the MSG Client and MSG Server is that the latter sends messages to the former which contain this message type and a data structure. The message type indicates the form of the request: in the present embodiment, a message type of "0" requests information about all messages within a specified mailbox, whilst a message type of "1" requests the actual audio data for a specified message. As previously stated, when the MSG Client is initiated, the WWW Server passes it a message type of 0, indicating that the MSG Client should commence with a request to list all the messages in the specified mailbox (ie the mailbox entered into the screen shown in FIG. 4). For a message type of 0, the data structure included in the request effectively only needs to contain the identity of the mailbox to be accessed and the password.

It is generally convenient for the MSG Client and MSG Server to be situated at the same location. This allows the link 360 between the two to be a relatively short and simple connection such as over a Local Area Network (LAN), permitting high bandwidth communications, and it is generally easier from a practical point of view to maintain compatibility between the MSG Client and MSG Server if they are reasonably near to one another. However, in other circumstances they may be at separate locations, with link 360 being provided over the Internet. It is also possible for there to be multiple WWW Servers and MSG Clients served by a single MSG Server.

On receipt of a message type of 0, the MSG Server 370 confirms that the password is correct for the specified mailbox, and then retrieves information relating to the messages belonging to the voice mailbox specified in the request. In order to do this, the MSG Server application is provided with the same knowledge of the structure of the voice mail database 390 as the DirectTalkMail voice messaging application 385 itself. This knowledge allows the MSG server to interrogate and access the voice mail database in the same manner as the DirectTalkMail program. Since the DirectTalkMail program is itself an application on top of the DirectTalk/6000 voice processing system, exploiting the custom server interface of the DirectTalk/6000 system in order to manage mailboxes and voice messages, it is straightforward for MSG Server to also manage voice mail using the same interface. Indeed, one possibility would be for the MSG Server to be incorporated within the DirectTalkMail program.

The information retrieved by MSG Client is then returned in a data structure back to the MSG Client. Such data communications are again performed using standard UNIX facilities for passing data between sockets. The data structure contains some general information about the mailbox (eg the number of outstanding messages, currently selected voice mail greeting etc), plus a list of messages in the specified mailbox, with information specific to each message (eg date and time received, origin of message etc).

The MSG Client then formats the retrieved information into another HTML page, which presents the voice mail contents for the specified mailbox. This formatted page is then returned to the WWW Server, and from there across the WWW to the WWW Client for display. Note that as far as MSG Client is concerned, it simply writes the HTML page to the standard output; the WWW Server (which of course initiated MSG Client) is then responsible for taking the output from there and transmitting it to the WWW Client, in accordance with standard WWW server operation.

Figure 5:
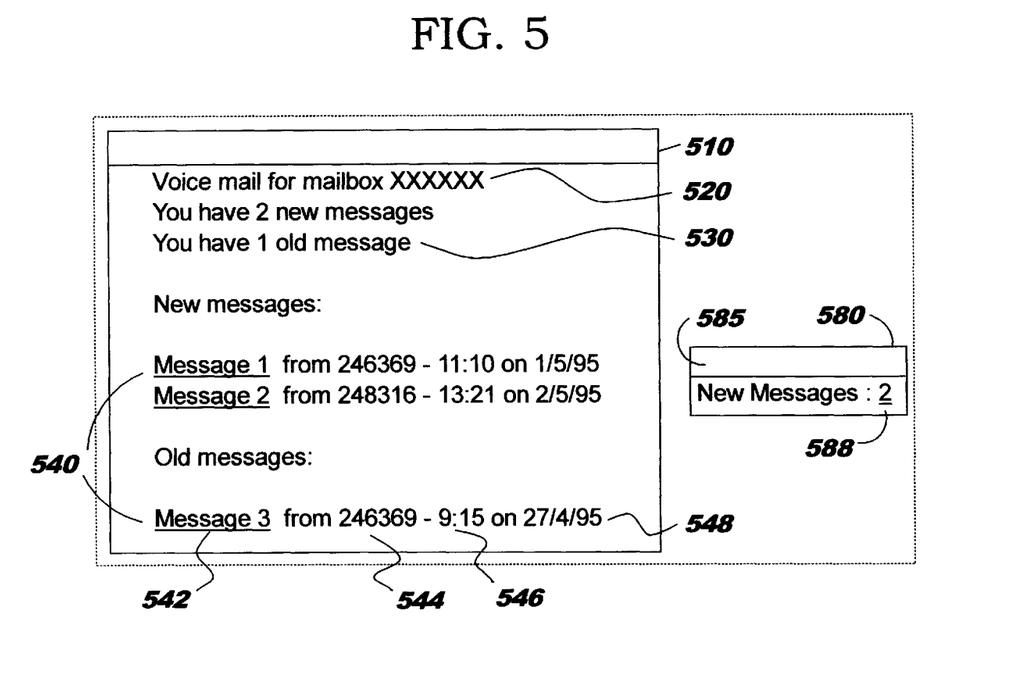
FIG. 5 is an illustration of a WWW screen providing access to the messages in a particular mailbox.

FIG. 5 is an illustration of such a page. As described in the above-mentioned PCT application, this page lists the current mail messages in the mailbox. There is a WWW Client control bar 510, as previously discussed in relation to FIG. 4, plus information particular to this URL. Thus a header 520 indicates the relevant mailbox number (shown schematically in FIG. 5 as "XXXXXX"). Next is general information 530 about the mailbox, in the present embodiment the number of new and old messages. Other information that might be displayed here would be current greeting, and time of last access to the mailbox. Then each message 540 in the mailbox is listed with its number 542, date 548 and time 546 of receipt, and extension number of caller 544 (if available). One possibility would be for either MSG Client or MSG Server to perform a database lookup on the extension number in order to replace the number with the name of the person associated with that extension (who presumably made the call).

As an enhancement to the system described in the above-mentioned PCT application, the Web page depicted in FIG. 5 also incorporates a Java applet. When invoked, this applet opens its own window 580 which is used to provide a message notification facility. The operation of this applet is described in more detail below.

It will be understood that FIG. 5 is effectively the page of data corresponding to hyperlink 430. In principle it would be possible to request the URL corresponding to FIG. 5 directly, rather than via Hyperlink 430, using standard WWW navigation facilites. However, using this route (ie by-passing the stage shown in FIG. 4) would mean that no mailbox number had been entered, and accordingly the attempt to go directly to the URL corresponding to FIG. 5 would fail.

It will be noted that in FIG. 5 each message number 542 has been underlined. In the actual embodiment, these are a different colour from the rest of the text (rather than being underlined), indicating that they also represent hyperlinks. As would be expected, each hyperlink corresponds to the message identified by that particular line, and associated with each hyperlink is a URL as specified in the HTML page output by the MSG Client. The URL for each message includes an encrypted form of the password entered into box 425 in FIG. 4. Thus without knowing the password for a given mailbox, it would be essentially impossible to guess the URL of any message within this mailbox, thereby preventing access by unauthorised people to the messages. Another possibility is for the encrypted password to be included in the screen of FIG. 5 as a hidden field, and then returned via the WWW server for verification if a message is selected.

In order to access a particular message, the user therefore selects the corresponding hyperlink 542. This results in a request for that URL being transmitted over the WWW to the WWW Server, which again detects that the URL corresponds to the MSG Client application program. This time however, when the WWW Server invokes the MSG Client, it specifies not only the mailbox number, but also the identifier of the requested message within that mailbox. Furthermore, the request type of the message is now "1", which indicates to the MSG Server that an actual voice mail message is desired.

It will be appreciated that each time the WWW Server invokes the MSG Client, a new copy of the MSG Client application is launched, rather than using the same copy for any particular user. This is why the WWW Server must specify the message type, since otherwise MSG Client does not know how far the interaction with the caller has progressed. Similarly, the newly invoked version of the MSG Client must be informed of the mailbox to be accessed. This can be done by extracting the mailbox number from the screen of FIG. 5, which was written there by the previous instance of MSG Client responsible for outputting the screen of FIG. 5, and returning this number to the newly created version of MSG Client. Of course, the mailbox number can be included with the encrypted password in the URLs for each message shown in FIG. 5, even if it is not specifically displayed on the screen.

The operation of the MSG Client for this new invocation is analogous to that for message type "0", in that it transmits a message to the MSG Server, this time with a message type of "1". The data structure included in this message not only identifies the mailbox, but also the desired message within that mailbox, determined of course by the particular hyperlink selected by the user. The MSG Server uses the mailbox number, and message number within the mailbox, in order to retrieve the actual audio data for the desired mail message. The audio data is then transmitted in digital form back to the MSG Client, again using standard UNIX communication facilities. The MSG Client then formats the message in accordance with standard WWW audio formats, before returning it to the WWW Server, for forwarding and playout at the WWW Client. Two standard WWW audio formats are a ".au" file, used for example in the IBM Ultimedia card, and a ".wav", used for example by SoundBlaster cards. The difference between these formats is primarily to do with the header information, rather than the actual storage of the audio data itself. A switch can be provided (for example in the screen of FIG. 5) to allow the user to select their desired choice of audio output file (in much the same way that many WWW sites currently provide a switch between different language output options).

It will be noted that the voice messages stored in the DirectTalkMail system are actually in compressed form to reduce storage requirements. When retrieved for playout the messages are decompressed in the present embodiment by the MSG Server. It would also be possible to perform the decompression at the MSG Client, which would reduce bandwidth requirements over link 360, which may be valuable depending on the nature of link 360. Of course, it would be even more efficient if the voice mail message could be compressed when transmitted over the WWW itself, where bandwidth certainly is constrained, but current WWW Clients are unable to perform the necessary decompression.

Although the present embodiment only supports actually listening to a selected message from the screen of FIG. 5, it is straightforward to extend this scheme to cover other message operations, for example deleting the message, forwarding it to another mailbox, or saving it (ie transferring it from the "new" to "saved" list). To provide such options, the message number might no longer be a hyperlink, but rather each message line would have appended multiple hyperlinks, for example one for "listen", one for "delete", and one for "save". Each of these three actions would have a different message type; thus "delete" might be message type 2, and "save" message type 3, with "listen" of course being message type 1 as above. On receipt of message type 2 or 3, MSG Server would then perform the requested operation to the message within the voice mail database. Following this, MSG Server would return to MSG Client an updated version of the screen of FIG. 5, with the selected message saved or deleted as appropriate.

Returning now to the Java applet which is incorporated into the Web page depicted in FIG. 5, the applet itself is identified using the html <APLLET> tag, and the code for the applet is retrieved from the specified location in known fashion. In the preferred embodiment, this code resides on WWW server 330, but could also reside on the DirectTalkMail system itself, or at any other suitable location. Once the browser at WWW client 310 has downloaded the applet, the applet is invoked by the browser and proceeds to execute on a copy of the Java virtual machine, which can be present either as part of the WWW browser, or incorporated into the operating system of WWW client 310 (indeed, the WWW browser itself may form part of this operating system).

Figure 6A:
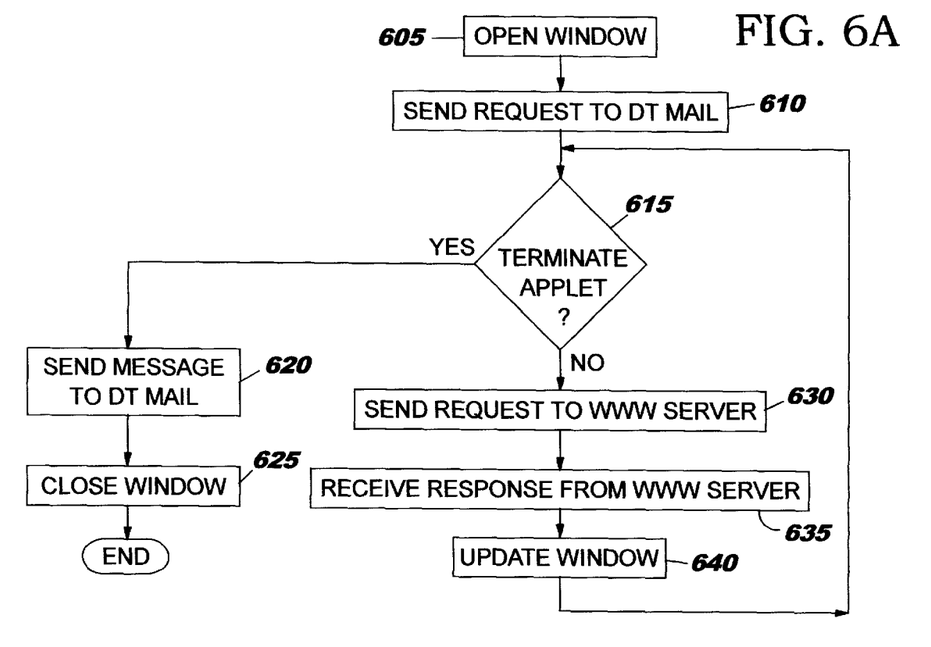
FIGS. 6A and 6B are flowcharts of methods used to provide notifications of new voice mail messages over the WWW.

The processing performed by the applet in a first preferred embodiment is illustrated in FIG. 6A. In this embodiment, the applet processing commences with opening a window associated with the applet (step 605). This window corresponds to window 580 in FIG. 5, and can be moved around the screen, minimised, etc using control bar 585 in known fashion for window-based environments. Next, the applet sends a request to the DirectTalkMail system, to indicate that the applet is now running (step 610). The purpose of this request is to inform the DirectTalkMail system that the applet is now available as a notification mechanism for the user, in addition to any other notification mechanisms (such as illuminating a light on a telephone handset) which that user has also selected. The request should include the mailbox number and password for that user (which as previously stated are included in the WWW page of FIG. 5, the latter typically in encrypted form).

It will be appreciated that the request in step 610 cannot be transmitted directly from the applet to the DirectTalkMail system since, for security reasons, an applet is only allowed to communicate directly with the server from which it was downloaded. Therefore the request is first returned to the WWW server 330, which passes it to MSG client 350 for forwarding to MSG server 370 (communications between MSG client 350 and MSG server 370 are enabled as previously described). MSG server can then update the user profile in the DirectTalkMail system 385 as required, after having confirmed the mailbox number and password.

Once the DirectTalkMail system 385 has been updated to include a reference to the Java applet in the user profile for notification, processing now continues in a loop until termination of the applet (step 615). This typically occurs via the Java destroy method when the browser at WWW client 310 is terminated, or alternatively the user may explicitly stop the applet by closing window 580. As part of its termination process, the applet sends a message (step 620) to the DirectTalkMail system, indicating that the applet is no longer available as a notification mechanism, and the relevant user profile is updated accordingly. This instruction is sent in the same way as the request in step 610 above. Next, the applet closes window 580 (step 625), before finally terminating.

In response to the request step 610, DirectTalkMail updates the profile for that subscriber to indicate that message notifications for that subscriber should be written out to a file on WWW server 330. This can be done by making the DirectTalkMail notification facility act as a client to a server process (not shown explicitly) running with WWW server 330. Thus as part of its message notification operations, DirectTalkMail outputs an updated indication of the number of new messages for the relevant subscriber to this server process, which then stores the information on WWW server.

Following step 610, processing by the applet then enters a loop, whereby periodically the applet sends a request to the WWW server 330 for the information about the relevant subscriber (step 630). The server then returns the information most recently supplied by the DirectTalkMail system (step 635), and this is then used by the applet to update window 580.

In the preferred embodiment, the information is written to a file on WWW Server 330, dependent on the mailbox number and password of the subscriber. Therefore, in order to access this file, the applet needs to know the relevant mailbox number and password for the subscriber. These are passed to the applet when it is invoked by the browser. Thus the mailbox number and password are included in the page shown in FIG. 5, even if not explicitly displayed, and so can be directly passed to the applet, since the applet is also included in this page. The applet then typically uses the hypertext transfer protocol (http) as is well-known in the art to request the relevant file containing the voice mail information for that subscriber from the WWW server 330.

The processing of the applet in a second preferred embodiment is illustrated in FIG. 6B, where again the applet initially opens window 580 (step 710). This window remains open until the applet is terminated at step 720, leading to closing of the window (step 730). Processing now goes into a loop comprising the steps of sending a request to DirectTalkMail (step 740) inquiring about the message status of a subscriber mailbox, receiving a response (step 750) from the DirectTalkMail system indicating the number of new messages, and using this received information in step 780 to update the window 580 accordingly.

As mentioned before, the applet cannot generally communicate directly with DirectTalkMail (unless the applet was originally downloaded from the DirectTalkMail system), and so in the preferred embodiment uses WWW Server 330, MSG Client 350, and MSG Server 370 in a manner analogous to that described above in order to communicate with DirectTalkMail system 385. Thus one possibility is for the applet to repeatedly request from WWW Server 330 the URL corresponding to the page shown in FIG. 5. The received html text can then be quickly parsed to extract the desired information (the number of new messages).

Figure 6B:
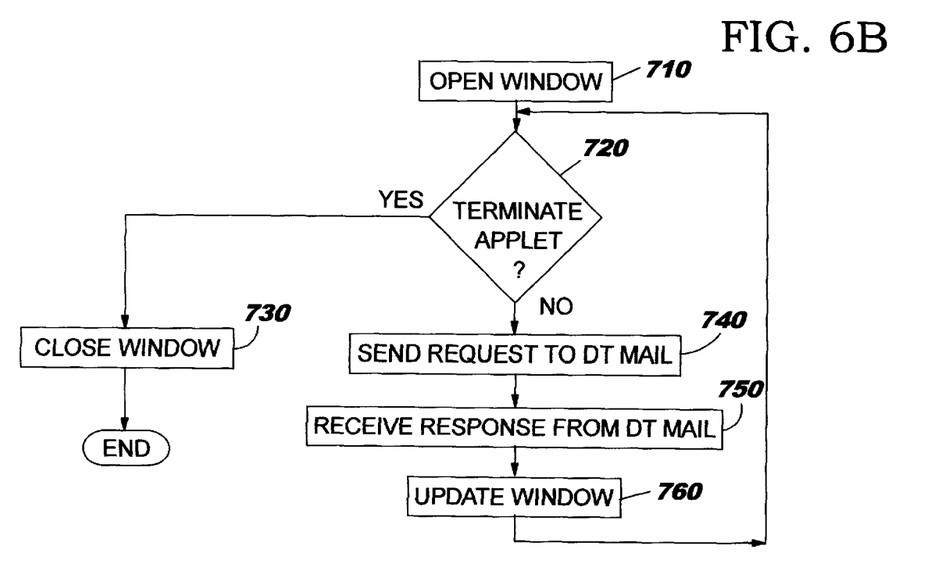

The time inbetween successive requests from the applet (ie step 630 or step 740) is typically a few minutes, although this could be a customisable feature of the applet.

The embodiment of FIG. 6B has the slight advantage in that it does not necessarily require any modification to the DirectTalkMail system itself, provided that the DirectTalkMail system already supports status enquiries over the Internet (eg as in the above-mentioned PCT application PCT/GB95/02009). However, this is at the expense of a greater burden on the DirectTalkMail voice mail system itself, since it has to respond to each request from the applet. By contrast, in the embodiment of FIG. 6A, most of this processing is off-loaded from the voice mail system onto WWW server 330, and the voice mail system itself only needs to act when an incoming message is received, or a message is listened to by a subscriber.

In the simplest embodiment, the applet window 580 may simply toggle between indicating that there are, or are not, new voice messages for the subscriber (analogous to a message waiting light). However, in the preferred embodiment, the applet window in fact indicates the precise number of new messages 588. This can be achieved directly with the embodiment of FIG. 6B, for example by extracting the relevant information from the Web page illustrated in FIG. 5. Likewise, for the embodiment of FIG. 6A, the DirectTalkMail notification facility can write out the current number of new messages to the WWW server 330, where the information can then be retrieved by the applet.

A further feature of the preferred embodiment is that window 580 may in fact includes a hyperlink itself, which is represented by the number of messages 588. Selection of this hyperlink causes the browser to load the URL associated with the hyperlink (this depends on the particular browser concerned having an interface to allow programs to direct them to a particular URL). In the preferred embodiment, this hyperlink corresponds to the Web page illustrated in FIG. 5. In other words, if user sees that new voice mail messages have arrived, they can activate the hyperlink 588 to listen to or otherwise process these messages. It will be appreciated that since the applet was originally included in the Web page shown in FIG. 5, then the identity of the relevant URL can be passed to it as as an initial parameter.

There are in fact a couple of complications involved with this approach. Firstly, it will generally be necessary in re-accessing this page to re-supply the password to the server; some browsers will automatically recognise this fact, and prompt the user to confirm that the same information that was entered in the Web screen in FIG. 4 should be returned to the server to re-load the Web screen of FIG. 5. This avoids the need for the user to have to explicitly re-enter his or her password. In addition, re-loading the Web screen of FIG. 5 may potentially start another copy of the same applet which generated the window 580. To avoid this, the first applet can set some flag as part of its start-up procedure; subsequent applications on the same machine then detect this flag and terminate themselves without further processing. This flag might typically be located on the WWW server 330, where the applet registers on start-up and de-registers on termination, or may possibly comprise some property of the Java virtual machine on which the applet is running (nb this latter approach may be defeated if the browser launches a new Java virtual machine at each applet invocation).

It will be appreciated that although in the preferred embodiments described above the voice mail system supports WWW access to voice mail, as described in PCT/GB95/02009, this is not a required feature. For example, the approach depicted in FIG. 6A may simply be provided as an enhancement of the notify function of a conventional voice mail system (ie one without WWW voice mail access), to enable a new message notification to be received by the applet.

Although the above preferred embodiments use an applet, downloaded over the Internet, to allow the client to communicate with a voice mail system concerning new messages, it will be appreciated that there are many other possible approaches. For example, an application program at the client might be used instead, possibly as part of the browser, with the appropriate address information etc being specified as part of the configuration of the application. In such circumstances the application may communicate directly with the DirectTalkMail MSG server, by-passing WWW server and MSG client 350, although it may be desirable to use these as intermediaries to minimise performance hits on the DirectTalkMail system itself.

A further preferred embodiment of the invention utilises an application residing at the WWW client 310. This embodiment is based on a "ticker" application, such as the NewsTicker application provided by IBM (or for example the Pointcast ticker, available from Pointcast, Inc, California, U.S.A. The newsTicker application runs at a WWW client and communicates over the Internet with a server using the http protocol (similar to the arrangement shown in FIG. 3). The server contains a database of news items. On a periodic basis (typically every few minutes) the ticker application sends a request to the server for updated information. The user can configure the ticker application to specify the appropriate server (or potentially, if supported, multiple servers), plus the news categories of interest. The server, on receipt of the request, looks for information in the categories of interest which have been updated since the last communication with the ticker, and returns a listing of those items. This listing includes not only the headline of the item, but also an associated URL where the whole news item can be accessed. The ticker application then scans through the listing displaying each in turn to the user. If the user selects a news item, then the ticker application instructs a WWW browser on the client to load the URL associated with that news item.

Assuming an arrangement analogous to that of FIG. 3, with the NewsTicker application running at the WWW client 310 and requesting updates from the WWW server 330, then voice mail notification can be provided as part of the NewsTicker service by adding an extra notification mechanism to DirectTalkMail to update the WWW server with respect to any new messages (it is common for the NewsTicker server to be fed news updates in this manner). Alternatively, the NewsTicker application might communicate directly with the MSG Server, typically by using the http protocol over the Internet. In other words, the NewsTicker application would repeatedly request an updated status from the DirectTalkMail system, which would respond accordingly with the number of new messages.

The use of a NewsTicker type application to provide the voice mail notification service offers several benefits. Firstly, it avoids the need to have to develop, maintain, and learn a special client system, but rather allows use of an existing client system (or a simple modification thereof). Further, if it is also generally desired to run the NewsTicker program anyway, then utilising this as well for the voice mail notification mechanism reduces overall client memory and processing requirements (since it avoids the duplication of having to run two analogous programs). It is also more convenient for the user to be able to have a single notification point for all the new information of interest to him or her (eg stock alarms, pager messages, and so on), and these can all be routed through a NewsTicker application. Moreover, allowing the DirectTalkMail system to utilise a NewsTicker server as an intermediary for the supply of voice mail notifications to a user allows the DirectTalkMail system to offload a lot of the centralised management, security, and administration tasks onto this server (which typically is already enabled with this sort of facility).

Note that a modification to the NewsTicker application to recognise voice mail updates would be desirable, in order to provide a static display of voice mail updates (as opposed to the scanning display used for news headlines), and also to provide password protection, similar to that described for the preceding embodiments.

It will be appreciated that in all the embodiments so far described, the client (either as an application or as an applet), has been responsible for repeatedly polling a server (either the DirectTalkMail system itself, or an associated server), to determine whether any new voice messages have arrived. This is a natural consequence of a client-driven client-server architecture. In this respect it should be noted that in the arrangement of FIG. 3, WWW Server will respond to a properly formatted request from any client in the network. There are no permanent links between the client and the server, in the sense that clients can connect to and disconnect from the network without informing the server, which has no knowledge that a client exists prior to receiving a request from it. Moreover, typically the server does not maintain any information about the client between responding to a first request from the client, and receiving a second request from the client.

In an alternative embodiment, it would be possible for the DirectTalkMail system itself to act as a client to a small server process running on the subscriber's workstation. The DirectTalkMail client would then update the subscriber's server process directly as part of its notification procedure. This avoids the unnecessary processing and communications associated with repeatedly polling at times when the number of messages for the subscriber is not changing.

Although in the preferred embodiment the client comprises an otherwise conventional computer workstation attached to the Internet, it will be appreciated that the invention is not so limited. For example, the client might comprise a so-called network computer or "thin" client, or any other hardware which is capable of receiving and processing code over the Internet. Likewise, the relevant network need not be the Internet, but might instead be an intranet (which typically uses Internet protocols such as http, but which is detached from the Internet itself, and is generally internal to just one corporation or enterprise), or any other suitable network. Further, whilst the applet to be downloaded in the preferred embodiment comprises Java byte codes, it might be in any appropriate language, and might be in a form either to be interpreted, for example by a virtual machine, as with Java, or to be directly executed on the hardware or by the operating system of the client. Moreover, as discussed above with reference to the NewsTicker application, this code need not actually be downloaded over the network at all, but may instead reside permanently as an application at the client.

What is claimed is:

1. A voice mail system, including:
    means for storing voice mail messages for at least one subscriber; and server means, responsive to a request from a subscriber at a WWW client terminal, for returning to said WWW client terminal an applet for execution at said WWW client terminal, said applet including:
        means for acquiring an area of a client terminal display device;
            means for transmitting successive requests to said voice mail system to inquire whether there are any new voice mail messages waiting for the subscriber, wherein the time interval between successive requests is of the order of ten minutes or less;
            means for receiving information from the voice mail system regarding any new voice mail messages waiting for the subscriber; and
            means for displaying at least part of the received information directly on the acquired area of said client terminal display device, without first saving the received information at the client terminal other than incidentally as required for the display, wherein the displayed information in said acquired area is generally maintained until updated by information received for a subsequent request;
        said applet thereby providing on execution at the client terminal a continuously updated indication of whether said subscriber has any new messages stored in the voice mail system.

2. The voice mail system of claim 1, further including:
    means for receiving from said applet a request that new messages for the subscriber should be notified to the applet.

3. The voice mail system of claim 2, wherein each subscriber has a profile indicating how that subscriber should be notified of the arrival of a new message, and said receiving means includes means for updating said profile on receipt of said applet request in order that the applet be notified accordingly of the arrival of a new message.

4. The voice mail system of claim 3, wherein the means for receiving futher includes means for receiving a request from the applet that new messages should no longer be notified to the applet, and means for updating said profile accordingly.

5. The voice mail system of claim 2, wherein the notification of a new message is transmitted to a server accessible by said applet.

6. The voice mail system of claim 2, wherein the notification of a new message specifies the current number of new messages for that subscriber.

7. The voice mail system of claim 1, further including means for receiving from said applet an inquiry as to whether any new messages have been received for that subscriber, means for determining whether any new messages have been received for that subscriber, and means for returning an appropriate response to the applet.

8. The voice mail system of claim 7, wherein said response includes the number of new messages received for that subscriber.

9. The voice mail system of claim 1, wherein said applet comprises Java code.

10. The voice mail system of claim 1, wherein said subscriber request includes a mailbox number.

11. The voice mail system of claim 10, wherein said subscriber request further includes a password.

12. A method of notifying a subscriber to a voice mail system that there is at least one new voice mail message waiting for the subscriber, comprising the steps of:
    executing a program at a client terminal where the subscriber is located, said client terminal including a display device, said program performing the steps of:
    allocating an area of said display device to said program;
    transmitting successive requests from said program to said voice mail system to inquire whether there are any new voice mail messages waiting for the subscriber, wherein the time interval between successive requests is of the order of ten minutes or less;
    receiving information from the voice mail system at the program at the client terminal regarding any new voice mail messages waiting for the subscriber; and
    displaying at least part of the received information directly on the allocated area of said client terminal, without first saving the received information at the client terminal other than incidentally as required for the display, wherein the displayed information is generally maintained in said allocated area until updated by information received for a subsequent request;
    thereby providing to the subscriber a continuously updated indication of the presence of any new voice mail message.

13. The method of claim 12, further including the program performing the initial step of:
    transmitting from said program to said voice mail system a start request that new messages for the subscriber should be notified to the program.

14. The method of claim 13, wherein each subscriber at the voice mail system has a profile indicating how that subscriber should be notified of the arrival of a new message, and the method further comprises the steps of:
    responsive to the receipt of said start request, updating said profile to indicate that the program be notified of the arrival of a new message for the subscriber; and
    transmitting notifications to a server accessible to said program in accordance with said updated profile.

15. The method of claim 14, further comprising the steps of the program transmitting an end request to the voice mail system that new messages should no longer be notified to the program, and the voice mail system updating said profile accordingly.

16. The method of claim 12, wherein said received information includes the number of new messages received for that subscriber.

17. The method of claim 12, wherein said program comprises an applet which is downloaded onto said client terminal.

18. The method of claim 17, wherein said applet comprises Java code.

19. The method of claim 12, wherein said program comprises a Ticker program.

20. The method of claim 12, wherein said subscriber request includes a mailbox number.

21. The method of claim 20, wherein said subscriber request further includes a password.

22. The method of claim 12, wherein said messages are exchanged over the Internet.

23. The method of claim 12, wherein said program provides a hyperlink to the subscriber, which, upon activation, automatically retrieves from the voice mail system further information about any new messages for the subscriber and displays such further information to the subscriber.

24. A client system for allowing a subscriber to a voice mail system to determine whether he or she has at least one new voice mail message, said client system being connected to said voice mail system via a network, and comprising:
  a display
  program means executing on the client system; said program means including:
    means for allocating an area of said display to said program;
    means for transmitting successive requests to said voice mail system to inquire whether there are any new voice mail messages waiting for the subscriber, wherein the time interval between successive requests is of the order of ten minutes or less;
    means for receiving information from the voice mail system regarding any new voice mail messages waiting for the subscriber; and
    means for displaying at least part of the received information directly on the allocated area of said client system, without first saving the received information at the client system other than incidentally as required for the display, wherein the displayed information is generally maintained in said allocated area until updated by information received for a subsequent request;
  thereby providing to the subscriber a continuously updated indication of the presence of any new voice mail message.

25. The client system of claim 24, further comprising means for transmitting to said voice mail system a start request that new messages for the subscriber should be notified to the client system.

26. The client system of claim 25, further comprising means for transmitting an end request to the voice mail system that new messages should no longer be notified to the client system.

27. The client system of claim 24, wherein said receive information includes the number of new messages for that subscriber.

28. The client system of claim 24, wherein said client includes a Ticker program.

29. The client system of claim 24, wherein messages from the client to the voice mail system include the mailbox number of the subscriber.

30. The client system of claim 29, wherein said messages are exchanged over the Internet network.

31. The client system of claim 30, further including means for providing a hyperlink to the subscriber, which, upon activation, automatically retrieves from the voice mail system further information about any new voice messages for the subscriber, and display such further information to the subscriber.

32. A WWW server, operable in conjunction with a voice mail system including means for storing voice mail messages for at least one subscriber, said server including:
  means responsive to a request from a subscriber at a WWW client terminal, for returning to said WWW client terminal an applet for execution at said WWW client terminal, said applet providing on execution at the client terminal a continuously updated indication of whether said subscriber has any new messages stored in the voice mail system and including: means for acquiring an area of a client terminal display device; means for transmitting successive requests to said WWW server to inquire whether there are any new voice mail messages waiting for the subscriber, wherein the time interval between successive requests is of the order of ten minutes or less; means for receiving information from the WWW server regarding any new voice mail messages waiting for the subscriber; and means for displaying at least part of the received information directly on the acquired area of said client terminal display device, without first saving the received information at the client terminal other than incidentally as required for the display, wherein the displayed information in said acquired area is generally maintained until updated by information received for a subsequent request; and
  means responsive to said successive requests from the applet to retrieve the requested information from the voice mail system.

33. A method of operating a WWW server in conjunction with a voice mail system for storing voice mail messages for at least one subscriber, said method comprising the steps of:
  responsive to a request from a subscriber at a WWW client terminal, returning to said WWW client terminal an applet for execution at said WWW client terminal, said applet providing on execution at the client terminal a continuously updated indication of whether said subscriber has any new messages stored in the voice mail system by acquiring an area of a client terminal display device; transmitting successive requests to said WWW server to inquire whether there are any new voice mail messages waiting for the subscriber, wherein the time interval between successive requests is of the order of ten minutes or less; receiving information from the WWW server regarding any new voice mail messages waiting for the subscriber; and displaying at least part of the received information directly on the acquired area of said client terminal display device, without first saving the received information at the client terminal other than incidentally as required for the display, wherein the displayed information in said acquired area is generally maintained until updated by information received for a subsequent request; and
  responsive to said successive requests from the applet, retrieving the requested information from the voice mail system.

* * * * *